(12) United States Patent
Wilson et al.

(10) Patent No.: US 7,890,628 B2
(45) Date of Patent: Feb. 15, 2011

(54) METHOD FOR CONTROLLING SERVICES

(75) Inventors: Julian Marcus Wilson, Bristol (GB); Steven Nicholas Haydock, Bristol (GB); Brendan O'Connor, Wotton-Under-Edge (GB)

(73) Assignee: STMicroelectronics Limited, Bristol (GB)

(*) Notice: Subject to any disclaimer, the term of this patent is extended or adjusted under 35 U.S.C. 154(b) by 1783 days.

(21) Appl. No.: 10/913,793

(22) Filed: Aug. 6, 2004

(65) Prior Publication Data

US 2005/0076127 A1 Apr. 7, 2005

(30) Foreign Application Priority Data

Aug. 6, 2003 (EP) .................................. 03254904

(51) Int. Cl.
*G06F 15/173* (2006.01)
(52) U.S. Cl. .................. 709/226; 709/208; 709/228
(58) Field of Classification Search ................. 709/203, 709/209, 226, 228, 229; 455/456.1; 710/72
See application file for complete search history.

(56) References Cited

U.S. PATENT DOCUMENTS

| 6,198,479 | B1 | 3/2001 | Humpleman et al. |
| 6,349,352 | B1* | 2/2002 | Lea ............................. 710/72 |
| 6,981,259 | B2* | 12/2005 | Luman et al. ............... 718/103 |
| 7,043,532 | B1* | 5/2006 | Humpleman et al. ........ 709/208 |
| 7,072,966 | B1* | 7/2006 | Benjamin et al. ........... 709/228 |
| 2002/0112058 | A1 | 8/2002 | Weisman et al. |
| 2007/0173266 | A1* | 7/2007 | Barnes, Jr. ............... 455/456.1 |

FOREIGN PATENT DOCUMENTS

GB 2 320 344 6/1998

* cited by examiner

*Primary Examiner*—Yves Dalencourt
(74) *Attorney, Agent, or Firm*—Lisa K. Jorgenson; Stephen Bongini; Fleit Gibbons Gutman Bongini & Bianco P.L.

(57) ABSTRACT

A method and apparatus are provided for controlling services provided at a first electronic device at a second electronic device. A plurality of electronic devices connected to a network provide services in the form of providing data to the network, or allowing the data to be manipulated. Each service is represented as a manipulable data object created at the device providing the service. Each object contains sufficient information to allow the service the object represents to be controlled. The objects are transmitted over the network and are stored in an object list maintained by a master device. Any compatible device may then retrieve an object from the object list and use the information contained in it to fully control the service.

35 Claims, 4 Drawing Sheets

METHOD FOR CONTROLLING SERVICES

FIELD OF THE INVENTION

This invention relates to the networking of electronic devices, and in particular to the networking of multimedia electronic devices in a home entertainment system.

BACKGROUND OF THE INVENTION

The increase in popularity and sophistication of electronic devices, such as multimedia apparatus and the like, has increased dramatically over recent years. Such devices typically offer wide range of services to provide data, access data or manipulate data for the benefit of a user. For example, a home entertainment system may include a television, set top box, DVD player, MP3 player and a digital camera. Traditionally, these devices have been used independently, or connected together only in simple configurations, with the result that full exploitation of their services is limited. Several devices may provide compatible services so that potentially, one device could exploit the services of others, for example allowing digital TV to be recorded on the hard drive of a lap-top computer.

Typically, devices are networked to overcome this limitation using a gateway or server box acting as a master with each of the devices acting as slaves. However, such a system is prone to failure because when the master box fails, is switched off, or otherwise inoperative, the whole system loses functionality. In this case the functionality of an individual slave device may be lost until the master is switched on, replaced or repaired. Additionally, such a system may also require significant modification of current hardware to implement with difficult and complex set-up procedures.

In conventional networked systems, devices communicate with each other via the master which controls data routing between devices. This arrangement increases the complexity of data routing and may slow down the network. Additionally, while such a network may be capable of allowing transfer of data between devices, full manipulation of the services provided by one device, by another device, may not be possible. Furthermore, complete information relating to the full range of services available from within the network may not be easily accessible or even exist at all. This disadvantage reduces the accessibility and flexibility of the system.

We have appreciated that networking electronic devices, particularly multimedia devices in a home entertainment system provides greater flexibility and functionality of the services provided by the devices. We have further appreciated the need to provide a network which is straightforward to set up requiring few modifications of existing hardware. We have further appreciated the need for a robust network which can function even following the failure of one or more of its constituent devices. We have also appreciated the need to provide each device within the network with easily accessible and complete information as to what services are available from within the network. We have further appreciated that allowing a device to fully manipulate the services of another device provides greater flexibility to the network. We have also appreciated that allowing devices to communicate directly with each other without the need for an intermediate device provides for faster communication and a simpler network.

SUMMARY OF THE INVENTION

The invention is defined in the independent claims to which reference may now be made. Advantageous features of the invention are set forth in the dependant claims.

In an embodiment of the invention, a plurality of electronic devices are inter-connected by means of a network. Each device connected to the network may provide or utilise services in the form of data, or perform actions by manipulating data. For example, the availability of a recorded film on the hard drive of a lap-top computer is a service provided by the lap-top computer, and pausing a play-back of the recording is an action. The availability of data, and the ability to perform actions may be referred to generally as services available from a device within the network. The services offered by each device, such as providing data or performing actions are represented by data objects which contain sufficient information to allow the service to be utilised by other devices. In particular, the objects contain the location of the data from within the network, the state of the data, and any configuration data necessary to process the data.

As simple examples, a device may offer the service of playing a video to the other devices, and this service is represented by an object. A stopped recording service may also be represented by an object in the same manner.

Each object is created by the device which provides the data, or which performs the action represented by the object. The objects are then stored within the network. Any other device may retrieve objects from the network and use the information contained in them to directly access and manipulate the data, and utilise the services that are available. In one embodiment, the objects are stored in a list maintained by one of the devices called a master device. The master device also maintains a user interface comprising a series of web pages through which a user may navigate to select and control services. Upon selecting a particular service, a copy of the corresponding object is retrieved from the list and transmitted to the device from which the selection was made.

A device providing a service to the network periodically retransmits the object representing that service to reconfirm that the service remains available. The master device receives the transmitted objects and continually updates the list accordingly. If the master does not receive a reconfirmation of a service from a particular device then it deletes the corresponding object from the list. This process ensures that unavailable services are removed automatically from the list when the device providing that service is removed from the network.

A method and apparatus are provided to deal with the event that the master device fails. Each device within the network periodically transmits a query message to the master device, and the master device responds with a confirmation signal transmitted over the network, to confirm that the master is still functioning. If the devices do not receive a confirmation signal then it is assumed that the master device is inoperative and a new master device is chosen.

In one embodiment, the device with the lowest IP address and which is capable of performing the task of the master device is chosen as the new master. Each master capable device transmits its own unique IP address across the network and, accordingly, receives the transmitted IP addresses of the other devices. A device assumes the role of the new master device only if it does not receive an IP address that is lower than its own. The new master device then transmits its IP address across the network to direct each device to associate that IP address with the master device. In this way, if the master device becomes inoperative, a new master device is chosen automatically thereby maintaining the functionality of the entire system.

DETAILED DESCRIPTION OF PREFERRED EMBODIMENTS

Figure 1:
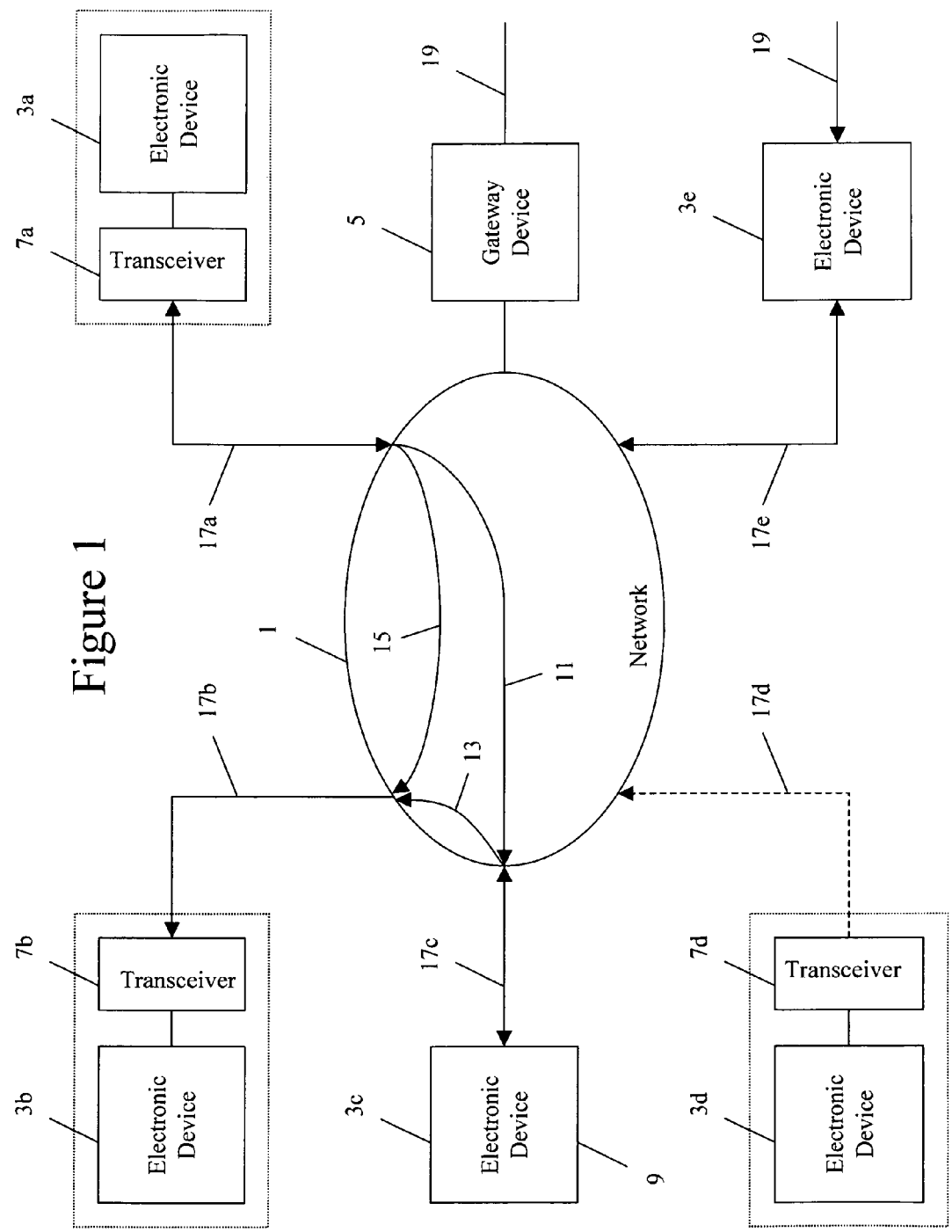
FIG. 1 is a schematic diagram of a network embodying the invention.

A system embodying the invention comprises a plurality of electronic devices 3 inter-connected by means of a network 1. FIG. 1 is a schematic diagram of the system. Preferably, the network 1 contains at least one device capable of providing data 3d or of utilising data 3b. Data may be provided in the form of data streams, or blocks of data. The term data stream will be used herein to include blocks of data in addition to a continuous stream of data. The devices also allow actions to be performed to manipulate the data, and in particular, to modify the state of a data stream. A device capable of providing a data stream such as a VCR with access to a collection of recordings is known as a server device. A device capable of utilising a data stream such as a set-top box connected to a television set is known as a client device. The term device will be used herein to also include two or more related devices that are connected together and interact with each other. For example, a television and set-top box may be considered as two separate devices, or may be considered together as a single device. A device may have the capability of both a client and server device to both provide and utilise a data stream 3a, 3c, 3e. In the preferred embodiment, the network 1 consists of a plurality of client and server devices 3 for use in a multimedia or home entertainment system.

The availability of a data stream, and the ability to perform actions to manipulate the data may be referred to generally as services available from within the network. The client and server devices 3, hereinafter referred to as devices, and associated input and output streams provide various services to the network 1, such as providing data or performing actions. For example, services may be provided by a lap-top computer, desktop PC, games console, television set, set-top box, DVD player, MP3 player, MJPEG camera or digital movie camera. Data may come in the form of video, audio or other data streams, or in the form of data blocks such as still images. The network 1 or any individual device 3 may also receive external data, via external connection 19, for example from satellite television, cable television, terrestrial digital television, terrestrial television, cable, Telco data or Telco telephone data.

A plurality of devices may provide multiple instances of the same service. For example, a set-top box with a hard disc drive can be used as a video recorder, or to facilitate time-shift viewing and replay, all services which may be provided equally well by a typical home computer or lap-top computer. Conversely, an individual device may provide multiple services to a user. For example, a games console may be used as either a games machine or a DVD player.

The devices 3 may be networked by any means allowing the transfer of data such as video or audio and other network traffic between the devices 3. In the preferred embodiment, the network 1 is an ethernet network with data being transmitted through the network 1 in the form of ethernet packets. Alternatively, a local hard wired intranet network may be used, if for example the devices 3 are confined to a small locale such as in a home or office. If the devices 3 are located remotely from each other, then a long distance broadcast network or internet network may be used. The network 1 may be connected to one or more further networks, external systems or data streams and resources by means of an external gateway connection 19a. In this way, a much broader range of services and data may be made available to the network 1. The external gateway connection may be provided by any suitable one of the devices 3, or by any purpose built gateway device 5.

Each device 3 interfaces with the network 1 by means of a transceiver 7 operated by a suitable software driver. Each transceiver 7 may come in the form of PCI, or PCMCIA ethernet, or other networking interface plug-in card which fits into a suitable slot in each device 3. Alternatively, a device 3c, 3e may already contain an appropriate transceiver interface connection without requiring any additional hardware. Each transceiver 7 comprises a processor arranged to execute one or more computer programs during operation of the system, and a memory to store the programs executed by the processor. In one embodiment, each transceiver 7 stores and executes up to four programs, conveniently referred to as 'object creator', 'master locator', 'service registration manager' and 'master alive'. Each of these programs performs a particular function in relation to the invention which are described in more detail hereinafter.

Each transceiver 7 connects to the network 1 via data pathway 17 and provides an interface between its associated device 3 and the network 1 so that data may be transferred between the network 1 and the device 3. In one embodiment, the connection between at least one transceiver 7 and the network 1 is wireless 17d. It can be seen that the additional hardware and software requirements for connecting devices 3 to a network 1 according to the present invention are minimal. This greatly reduces the cost and difficulty in setting up the network.

The devices 3 provide services to the network 1 including feeding data into the network 1, and allowing manipulation of the data. According to the present invention, each service available to a device in the network is represented as a manipulable data object 31 created at the device 3 providing the service. In the case of providing data, the object is created at the data providing device, and in the case of the service being an action, the object is created at the device which performed the action. In an alternative embodiment, objects representing actions may be created at the device providing the data stream. Each of the objects are transmitted to and stored within the network 1. These objects 31 then become available to the other devices 3 to retrieve from within the network 1 to access and control the service. In general, an object is a set of data, which define a service, and a set of actions that can be performed on the object, which define the ways in which a service can be manipulated. Any compatible device 3 may retrieve an object 31 and use the information contained in it to access the service, and manipulate the object 31 to control the service.

In this way, a first device effectively acquires the capability to provide a user with services provided by a second device, even if the first device, individually, is not capable of providing that service. For example, a satellite receiver provides a service in the form of a satellite video data stream into the network 1. An object 31 is created which represents this service, and allows other devices to access that data stream. The object 31 contains sufficient information to allow a device to fully access and control the service. In this case, the object 31 contains information allowing a device 3 such as a television set to locate the source of the data stream from within the network 1 so that a user may watch satellite television, even though the television set, locally, has no satellite receiving apparatus. By manipulating a copy of the object 31, the device may pause or record the satellite data remotely, causing the creation of new objects representing these actions.

In a second example, the availability of an audio or video recording causes an object 31 to be created representing the recording. A first device may retrieve a copy of this object, locate the source of the recording, and initiate a play-back. A corresponding 'record' object is created when any device initiates a recording, for example of a television broadcast. When an action is performed by the first device such as pausing the play-back, a further object is created to represent the action. This additional object is similar to the original object except that it is modified to indicate the change in status of the data stream resulting from the action. This 'pause' object represents the audio recording paused at a specified point. In addition, the original object may also be modified to indicate the change in status. The objects 31 may be modified to indicate the paused status of the data stream, and to indicate at which place in the data stream the recording has been paused. The modified objects 31 become available for any other device 3 to manipulate.

A second device 3 may retrieve and take ownership of the 'pause' object 31 to resume the play-back from the point at which it was paused, even though this second device 3 may be in a different location to the first device 3, and the source of the recording. When the play-back is resumed, the pause object is deleted. In an extension of this principle, a series of 'pause' objects 31 may be continually created and deleted consecutively by a plurality of play-back devices 3 at different locations according to the detection of motion of a person. In this way, the network 1 allows a play-back to automatically 'follow' a person as he moves from room to room. Such a process may be referred to as space-shifting.

Some devices allow 'pausing' of live television or other broadcasts by recording the live data stream when a pause is initiated, and then playing back the recording rather than the live data when viewing is resumed. This process is known as time-shift viewing. In this case, when a device performs a pause action to pause the broadcast, a record action is automatically initiated by a selected device so that the data is recorded. In addition to the creation of the pause object by the device which performed the pause action, a further object representing the record action is also automatically created by the device which is recording the data. When any one of the devices connected to the network resumes the play-back, both the pause and record objects are retrieved. The record object may then be used to locate the recording from within the network and access the service. When the play-back is resumed, the pause object is deleted, but the record object is not because it is necessary to continue recording the data until real-time viewing is resumed. Preferably, the record object is not directly selectable by a user, but rather, the manipulation of the record object is automatically controlled as the pause object is manipulated.

An object 31 may only be meaningfully owned and utilised by a device 3 if that particular device 3 is compatible with the service represented by the object 31. For example, an object 31 representing a video play-back cannot be used by stereo equipment, but may be used by video apparatus or a lap-top computer.

The creation of an object 31 representing a service is performed by the object creator program executed by the transceiver 7 of the device 3 providing that service. The object creator analyses the data stream associated with the service, extracts information from the data stream, including the status of the data stream, and generates an object 31 using this information. This information may consist of, for example, the type of service or the file format of the data stream. The object creator also collects information relating to the device 3 providing the service, such as configuration settings. The object creator forms the object 31 in a predefined format before converting it into ethernet packets and transmitting it via a communication link 17 over the network 1. In the preferred embodiment, the object 31 is periodically transmitted over the network 1 while the service remains available as a confirmation.

Figure 2:
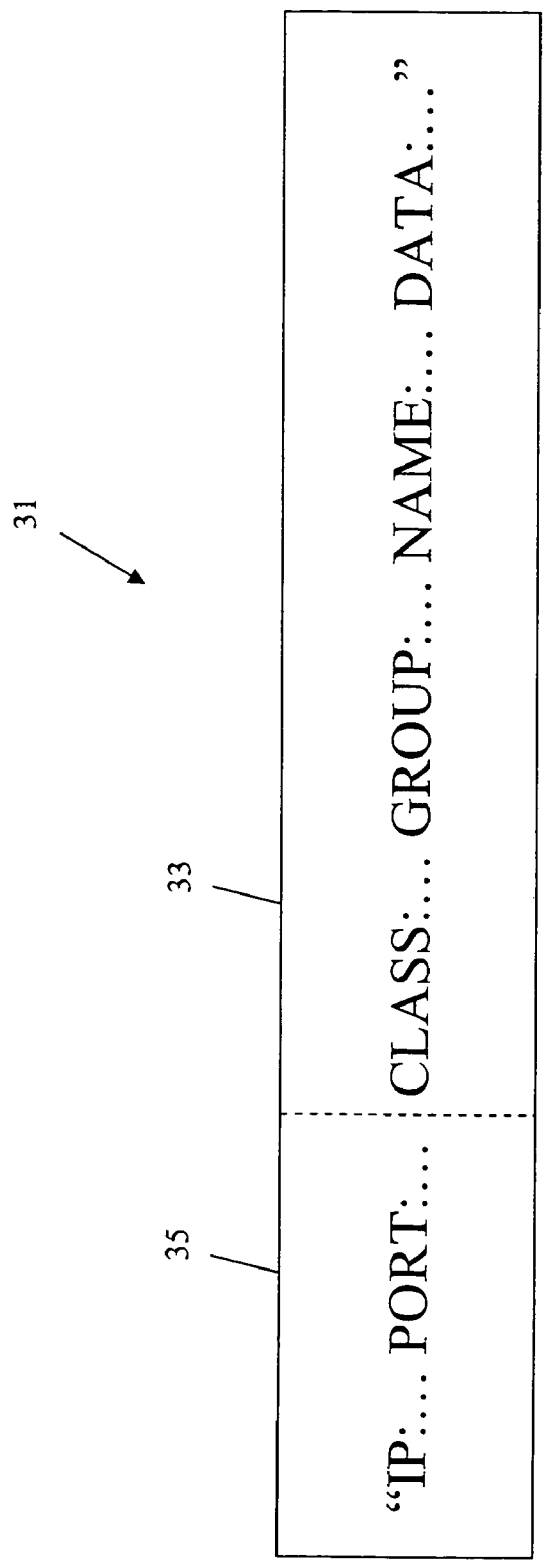
FIG. 2 is a schematic diagram of an object text string.

In the preferred embodiment, an object 31 comprises a text string containing sufficient information to fully define the service that the object 31 represents. This information allows a device 3 to locate the device 3 providing the service within the network 1 and the source of the data stream. FIG. 2 is a schematic diagram of an object text string. The object text string 31 is a single line string containing various data fields, and is formed of two parts. The first part 33 is created by transceiver 7 associated with the device 3 providing the service, and the second part 35 is pre-appended to the first part 33 by a master device 9, which stores the object strings 31 in a data store.

The first part 33 of the object string 31 contains data fields 'CLASS', 'GROUP', 'NAME' and 'DATA'. The CLASS field contains information relating to the class of service that the object 31 represents. This may comprise file format or data storage medium information, and provide an indication of the compatibility of the service. For example, the CLASS field may contain a string identifying tuner, AVI file, or disc. The CLASS field includes information extracted from the data stream by the object creator program.

The GROUP field identifies the object 31 as belonging to a particular group of objects sharing a common property. For example, a group may be defined as video recordings made on a particular date or by a particular person. The entry in the GROUP field may be user defined, automatically defined by the object creator program or a combination of both. In the case of an automatic entry, the GROUP field may be used to group services provided by pay-television systems according to their cost. In the case of a user generated entry, the GROUP field may be used to facilitate the organisation of multiple objects 31 in an object database. For example a user may wish to allocate an object 31 to a group of object such as 'Fred's recordings'. The information contained in the GROUP field may permit grouping of objects 31 extending beyond simple individual grouping. Objects may be grouped in alternative ways, or may be grouped in a hierarchical structure.

The NAME field contains a text string providing an indication of the service represented by the object 31 which is displayed to the user on a user interface. This may be for example the name of a recorded television program or the name of a pay-television channel.

The DATA field contains any further information required to sufficiently define the service such as a transceiver transponder number, a tuning frequency, or an internal file name for a video recorder. The DATA field contains information relating to the status of the data stream represented by the object string. For example, the DATA field may indicate that the stream is in a paused state, and contain data relating to the place at which the stream has been paused. Upon performing an action, this data may be modified so that for example a paused play-back may be resumed. The DATA field may also provide data which is complementary to that contained in the CLASS field.

After the object creator has created the first part of the object string 31, the master device 9 pre-appends two further data fields to the object string 31, 'IP' and 'PORT'. These two fields contain the IP address and port number of the device 3 providing the service, to allow the device 3 to be located from within the network 1. For example, the entry in the PORT field may be used to distinguish between a tuner and a cable tuner in a single device.

Once a device 3 has retrieved a copy of an object string 31 from the network 1, then that device 3 may utilise the service defined by the object string 31. Since all necessary information is contained in the object string 31, the device 3 need not refer further to the master device 9, or any other intermediate system, but rather access the service directly from the service provider. This simplifies data communication across the network and provides for a faster network which is less prone to data congestion.

Objects 31 created in response to the availability of services from the network 1 are stored by one of the devices 3 called the master device 9. The master device 9 acts to collate available services, and to maintain a list of the corresponding objects 31 available to the network 1 for manipulation. An object 31 representing a service is partially created by the device 3 providing that service, and the object 31 is transmitted over the network 1 to the master device 9 via network pathway 11. The master device 9 completes the object string 31 by pre-appending the IP and PORT data fields, and stores the complete object string 31 in a list.

Not all of the devices 3 connected to the network 1 may be capable of performing the task of the master device 9. For example, a simple web camera with limited circuitry may not be able to function as the master device 9. A master capable device must either contain an appropriate transceiver 7, or posses sufficient memory and processing capacity to maintain the list of object strings, and perform the other functions of the master device 9. In particular, the master device 9 must have stored in its associated transceiver 7, and be able to execute, the service registration manager program and the master alive program. The role of the master device 9 may also be taken by a purpose built device connected to the network 1, or a transceiver 7 not associated with any particular device 3.

Figure 3:
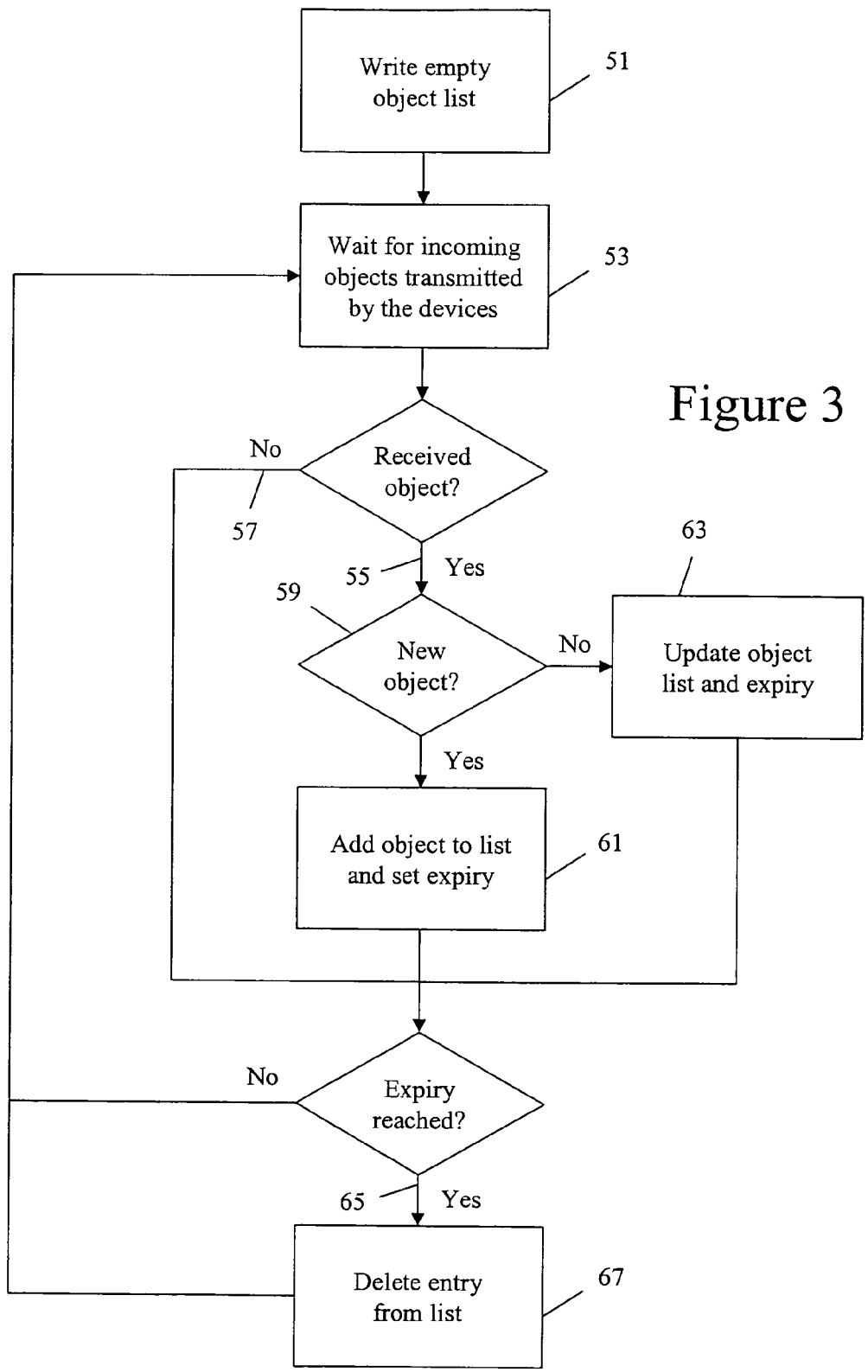
FIG. 3 is a flow diagram of the process carried out by the service registration manager program.

FIG. 3 is a flow diagram of the process carried out by the service registration manager program. The service registration manager initially writes an empty object list 51 and waits 53 for incoming object strings 31 originating from any devices 3 within the network 1. For example, an object string 31 originating from a device 3a is created by its associated transceiver 7a, transmitted to the network 1 along data pathway 17a, through the network 1 via network pathway 11, and to the master device 9 via data pathway 17c.

Each object string 31 is periodically retransmitted by the device 3 at which it was created to reconfirm that the service remains available. In one embodiment, the object string 31 is retransmitted every four seconds. This period is chosen so that changes in status of services are quickly registered with the master device 9 so that they are available to users in a short time. If an object string 31 is received 55 by the master device 9, the service registration manager determines whether the object string 31 is new or a reconfirmation 59. If the object string 31 is new, it is added as a new entry 61 to the object list. If the object string 31 is a reconfirmation, the object list is updated accordingly 63.

The service registration manager defines a timeout period for each entry in the object list, indicating the time by which a reconfirmation should be expected if a service remains available. When an object string 31 is received by the master device 9, the timeout period is updated, in the case of both new strings 61 and reconfirmed strings 63. If an object string 31 is not reconfirmed within the predetermined timeout period 65, for example 20 seconds, the object string 31 is removed from the object list 67 by the service registration manager. This ensures that if a device 3 is removed from the network 1, or becomes inoperative, then the services offered by that device 1 are automatically removed from the object list. This provides the advantage that no explicit service removal commands are required if a service becomes unavailable. This is useful in cases where devices 3 are removed accidentally, for example if a cable is pulled out or cut, in which case the device 3 would not be able to transmit any signal indicating its absence from the network 1.

The timeout period is preferably chosen to be longer than the period between retransmission of successive object strings 31 to avoid unnecessary deletion and re-addition of entries in the object list. It is also chosen to be sufficiently long to allow an accidental disconnection to be rectified without disrupting the object list. The timeout period should, however, be short enough so that changes in service availability are quickly reflected in the object list. In this way, resources may be added to or removed from the network simply by plugging into, or disconnecting from the physical network 1. The retransmission of object strings 31 ensures that services are added to or removed from the list of available services automatically. This 'plug and play' arrangement greatly facilitates the addition of devices 3 to the network and simplifies network set-up procedures.

When a device 3 performs an action to modify the state of a data stream, for example pausing a play-back, in addition to the creation of a new object, the object 31 representing the data stream stored in the object list may also be modified to indicate the change in status of the data stream. The device 3 which performed the action transmits a signal over the network 1 to the master device 9, to instruct the service registration manager to modify the relevant object 31 in the object list to reflect the action performed. In the case of a paused play-back, the signal may instruct the service registration manager to alter a status flag in the DATA portion of the object string 31.

The service registration manager additionally comprises software to generate one or more web pages from which services may be accessed. In this way, the service registration manager provides a user with a user interface from which he may select various services by navigating through a sequence of web pages. Preferably, the user interface is maintained using DHTML and JavaScript to allow dynamic interaction with, and updating of the web pages. When a new object string 31 is added to the object list, the service registration manager adds a new entry to the appropriate web page so that the service represented by the object becomes selectable by the user. When an action is performed to manipulate a service, the service registration manager alters the appropriate web page entry accordingly. The web page may be automatically refreshed periodically to reflect any recent changes, or the user may manually refresh the web page at any time. In this way, a dynamic user interface is created that is continually updated to reflect changes in services available from the network 1.

In the preferred embodiment, the list of available services are distributed over several web pages to facilitate location and selection of particular services. The service registration manager may organise the object strings according to entries in the GROUP field of each object text string, and may use entries in the NAME or GROUP fields as display parameters.

In an example, a user may select services that are available from within the network 1 in the following way. The user downloads the network home page created by the service registration manager as a DHTML page. This page is displayed by any suitable apparatus using a standard internet browser, such as the Ant Fresco (RTM) browser. The master device 9 itself need not be capable of displaying the web page, but only to create and maintain the web page. For example, a digital camera may have the processing and memory capabilities to maintain the web page, but may have no means to display it to a user. In this case, a suitable device may access each web page over the network 1 from the master device 9 and present it to a user using its own browser and display apparatus.

The home page contains a menu of options comprising a series of hyperlinks corresponding to groups of objects 31 representing various services. The grouping of the objects 31 are defined in the GROUP field of each object text string. The hyperlink may be presented using data from either the NAME or GROUP field of the object text string 31. For example, the home page may display a list of hyperlinks reading 'video', 'audio', 'games' etc. to allow the user to select video, audio, or game related services. These groups may be user defined or may be created automatically by the service registration manager. If the user wishes to view a video recording of a film for example, he selects the video hyperlink. Each hyperlink is associated with an underlying web address to transfer the user to the relevant page upon selecting the hyperlink. If the user selects the video hyperlink, he is presented with a further web page which may contain further menus items represented as hyperlinks. An item in a menu may correspond directly to a service, or may transfer the user to a further sub menu. For example, one item in the video menu may allow the user to view a particular pay-television channel. Another menu item may be a hyperlink to yet a further web page from which the user may select from a library of video recordings.

The selection of a service from the user interface activates a JavaScript function to instruct the service registration manager to retrieve a copy of the appropriate object string 31, and transmit it to the device 3 at which the selection was made. The object string 31 is converted into ethernet packets, transmitted to the network 1 via data pathway 17c, over the network 1 via network pathway 13, and to the device 3b via data pathway 17b. The requesting device 3 may then use the object string 31 to utilise and manipulate the selected service. Once the object 31 has been retrieved, all information necessary to communicate with the device 3 providing the service is contained in the object. A direct network pathway 15 may then be selected to transfer data and control signals between the device 3 providing the service and the device 3 requesting the service. The more convoluted pathway 11, 13 between devices 3a, 3b via the master device 9 is avoided and data transfer is simplified.

The control signals transmitted along direct network pathway 15 allow one device to fully control the services of another device. For example, the device which retrieved the object may transmit signals along network pathway 15 to instruct the service providing device to transmit data from a data stream back along network pathway 15 to the device. The device may also transmit signals along network pathway 15 instructing the service providing device to perform an action such as pausing the data stream. When an object string 31 is retrieved by a device 3, the service registration manager may modify the object string 31 contained in the object list to indicate that the object 31 is currently 'owned' by a device 3 and is unavailable to other devices 3.

The user interface may be arranged to restrict the possible selection of services by a user. For example, a device 3 which is an MP3 player may not allow the user to select a video data stream. Some objects 31 may exist within the system, but remain unavailable because for example they are currently owned by other devices 3. For example, a play-back object may not be available to another device 1 until the play-back is paused. In another example, if a tuner is tuned into one particular channel, the other channels may be unavailable. Objects 31 which exist, but are nevertheless currently unavailable may be hidden on the user interface, or they may be visible but unselectable.

Using this method, a user is able to browse the web pages by selecting hyperlinks to select services. The hierarchical structure of the user interface facilitates organisation of the list of available services and allows a user to find particular services more easily. In one embodiment, the user is able to organise the series of menus according to his own preferences. The services offered by the network 1 are managed by content of the data rather than by the provider or location of the service. This provides the advantage that if a user wishes to view the list of available recordings, for example, all of the recordings within the network 1 will be presented, regardless of whether they are on a set-top box, hard drive, a PC, or a DVD player. A user may not even need to be aware of the location of a data stream or the source of a service. It may be preferable to hide such details from a user to simplify the user interface. Similarly, if a user wishes to initiate a video recording, it may not matter which device 3 makes the recording. In this case, the user will be presented with a single record option to select, and the registration manager will choose the most appropriate device 3 to use automatically. However, a user may wish to deliberately choose to record data on one device 3 rather than another, for example because he requires it to be permanent or portable. In this case, an option for each device 3 may be presented. In this way, it can be seen that a user may be relieved of the task of organising and keeping track of the recordings, or may have greater control if he chooses. In some cases, it may be appropriate for the selection of objects 31 from the object list to be entirely automatic, for example in the case of time-shift viewing.

If the master device 9 becomes inoperative, or is otherwise unable to function as the master device 9, to avoid losing the functionality of the entire system, a new device 3 is chosen to be the master device 9. The master device 9 may become inoperative for example by being damaged or disconnected from the network 1. The choice as to which device 3 becomes the new master device 9 may be made in several ways. For example, a new master device 9 may be chosen according to a predefined selection order, or may be chosen randomly. In the preferred embodiment, each device has at least one unique identifier, for example the IP address of the device. In this embodiment, the device 3 with the lowest IP address capable of performing the task of a master device is chosen.

The master locator program and master alive program respectively perform the tasks of checking and confirming the operability of the master device 9. The master device 9 transceiver executes the master alive program, and each other device 3 transceiver executes the master locator program.

Figure 4:
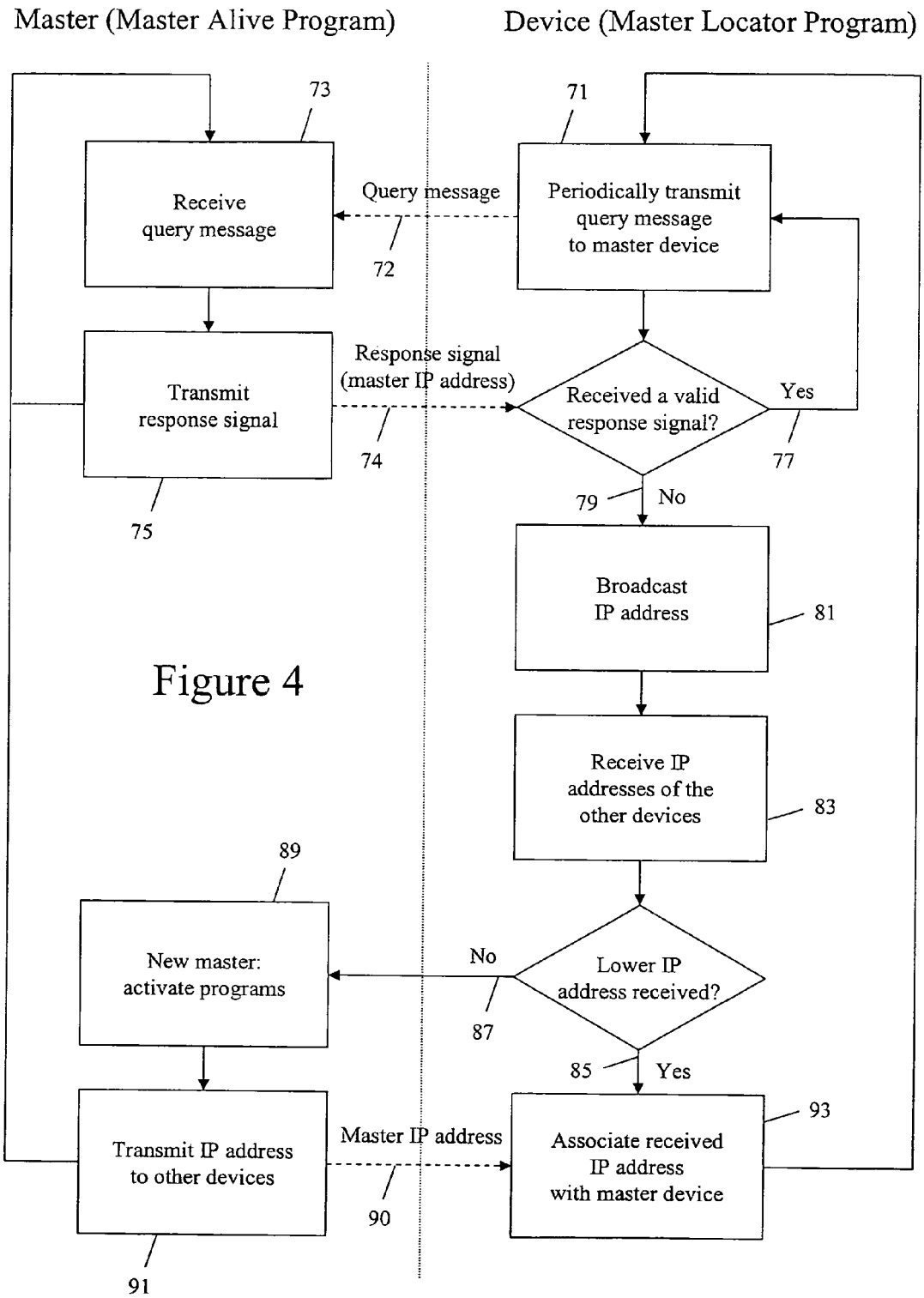
FIG. 4 is a flow diagram of the process carried out by the master locator program and the master alive program.

FIG. 4 is a flow diagram of the process carried out by the master locator program at each device 3 and the master alive program at the master device 9. In order to detect a failure of the master device 9, the master locator causes the transceiver 7 of each device 3 within the network 1 to periodically broadcast 71 a query message 72 to the master device 9. When the master device 9 receives a query message 73, the master alive program causes the transceiver of the master device 7 to transmit 75 a response signal 74 over the network 1 to confirm that the master device 9 remains operative. In one embodiment, the response signal 74 is the IP address of the master device 9. If each of the devices 3 receives a valid response signal 77 then no change is made regarding the identity of the master device 9 and the process is repeated. A response signal 74 is valid if it corresponds to the expected IP address of the master device 9 stored in each of the other devices 3. If, however, the devices 3 do not receive a valid response signal 74 within a predetermined time after transmitting the query message 79, each device 3 assumes that the master device 9 is inoperative and a new master device 9 is chosen. In one embodiment, a new master device 9 is chosen if a response signal 74 is not received within 20 seconds from transmitting a query message 72.

In an alternative method to detect the failure of the master device 9, the master device 9 periodically transmits a signal confirming its operability without prompting by other devices 3.

When the system has determined that a new master device 9 is required, each device 3 in the network 1 capable of becoming the master device 9 transmits its IP address over the network 1 to each of the other devices 81. A device 3 is considered capable of becoming a master device 9 if either it possesses an appropriate transceiver 7, or is able to execute the programs necessary to perform the tasks of the master device. The master device 9 for example must be capable of hosting the service registration manager for creating and maintaining the user interface web page. The IP addresses of each master capable device transmitted across the network 1 are received by each device 83. A particular device 3 assumes the role of the master device 9 only if it does not receive an IP address which is lower than its own. This process ensures that the role of the master device is taken by the master capable device having the lowest IP address. The new master device 9 transmits 91 its IP address 90 over the network 1 to inform each other device 3 to associate that IP address with the master device 93. The new master device 9 then begins to execute the process of the master alive program and the above process is repeated.

When the role of the master device 9 is transferred from one device 3 to another, no transfer of program code across the network 1 is required. At any time, all master capable device transceivers contain the necessary program code and data to operate as the master device 9, but only one device will be active as the master device 9. It is necessary for each master capable device to be pre-programmed for that purpose since if the program code were instead transferred, if the master device 9 were to become disabled, it would not be able to transmit the program code at all. Similarly, if the master device 9 is disabled, it may be unable to transfer the object data contained in the object list. Rather, the old list is abandoned and a new list is created completely by the new master device. Since object strings 31 are transmitted periodically, for example every four seconds, the maximum time required for the new master device 9 to rebuild the object list is equal to the period between successive object string 31 transmissions. Therefore, if the object strings 31 are retransmitted frequently, the maximum object list rebuild time will be correspondingly short. This prevents excessive delays in functionality of the system when a new master 9 is allocated.

In an alternative embodiment, a 'shadow' object list may be maintained in all devices simultaneously so that when a new master device 9 is chosen data transfer overhead is restricted to a minimum. In this embodiment, when the object list is updated by the active service registration manager, each shadow object list is also updated in an identical manner. The master may transmit signals to the other devices to provide information relating to updating the object list.

It is understood that the present invention is not limited to the networking of multimedia devices, but is also applicable to any devices which may provide services, or perform actions in a more general sense. For example, a light switch provides a service of illumination, and switching the light on or off, or modifying the brightness are actions that may be performed. In further examples, an oven, washing machine, or other household appliance provide services which may be controlled by actions. By connecting these devices to a network, the present invention would allow a user to control the devices remotely, for example while at work.

GLOSSARY

AVI Audio Video Interleaved
DHTML Dynamic Hypertext Markup Language
DVD Digital Versatile Disc
IP Internet Protocol
MJPEG Motion Joint Photographic Experts Group
MP3 MPEG-1 Audio Layer-3
MPEG Moving Picture Experts Group
PC Personal Computer
PCI Peripheral Component Interconnect
PCMCIA PC Memory Card International Association
VCR Video Cassette Recorder

What is claimed is:

1. A method for transferring control of a service provided over a network from a first electronic device to a second electronic device, said method comprising the steps of:
   performing, by the first electronic device, a first action to control the service;
   in response to performing the first action to control the service, creating, by the first electronic device, a first data object representing the first action;
   transmitting the first data object from the first electronic device over the network to a third electronic device for storage in a data object list that is maintained by the third electronic device; and
   performing, by the second electronic device, a second action to control the service based on the first data object, so as to transfer control of the service from the first electronic device to the second electronic device.

2. The method according to claim 1, further comprising the steps of:
   creating, by a fourth electronic device, a second data object to represent the service in response to the fourth electronic device making the service available to the network;
   transmitting the second data object from the fourth electronic device over the network to the third electronic device for storage in the data object list that is maintained by the third electronic device; and
   performing, by the first electronic device, a third action to control the service provided at the fourth electronic device from the first electronic device based on the second data object.

3. The method according to claim 2, further comprising the steps of:
   retrieving the second data object from the data object list;

using the information contained in the second data object to locate the source of the service within the network.

4. The method according to claim 2, wherein in the step of creating the second data object, the fourth electronic device creates the second data object in response to the availability of data.

5. The method according to claim 4, wherein the data is in the form of a video and/or audio data stream, or a data block.

6. The method according to claim 5, wherein the step of performing a third action comprises the sub-steps of:
retrieving, by the first electronic device, the second data object from the data object list; and
initiating a play-back of a data stream.

7. The method according to claim 1, wherein the first action is pausing the play-back of a data stream.

8. The method according to claim 7, wherein the step of performing a second action comprises the sub-steps of:
retrieving, by the second electronic device, the first data object from the data object list; and
resuming the play-back.

9. The method according to claim 1, wherein the first and second electronic devices are at different locations.

10. The method according to claim 1, wherein the transmitting step comprises the sub-step of periodically retransmitting the first data object to the third electronic device to confirm that the first data object remains available.

11. The method according to claim 10, further comprising the step of removing, by the third electronic device, the first data object from the data object list if the first data object is not retransmitted within a period of time.

12. The method according to claim 1, further comprising the step of:
in response to the first electronic device performing the first action to control the service, modifying a second data object in the data object list,
wherein the second data object represents the service.

13. The method according to claim 12, further comprising the step of:
in response to the second electronic device performing the second action, deleting the first data object from the data object list.

14. The method according to claim 1, further comprising the steps of:
creating, by a fourth electronic device, a second data object to represent the service in response to the fourth electronic device making the service available to the network; and
in response to the second electronic device performing the second action, performing, by the fourth electronic device, the service.

15. The method according to claim 1, further comprising the step of appending, by the third electronic device, additional information to the first data object before storing the first data object in the data object list that is maintained by the third electronic device.

16. The method according to claim 1, further comprising the step of:
in response to the third electronic device receiving the first data object from the first electronic device, modifying a second data object in the data object list so as to indicate that the second data object is owned by the first electronic device and is unavailable to other electronic devices,
wherein the second data object represents the service.

17. An electronic device, the electronic device comprising a processor arranged to:
perform a first action to control a service available over a network;
analyze the first action;
extract information from the first action;
create a first data object representing the first action;
transmit the first data object over the network to a third electronic device for storage in a data object list that is maintained by the third electronic device; and
in response to a second electronic device in the network performing a second action based on the first data object, allow the second electronic device to control the service based on the first data object that was transmitted, so as to transfer control of the service from the first electronic device to the second electronic device.

18. The electronic device according to claim 17,
wherein the electronic device is further capable of providing a service over the network, and
the processor of the electronic device is further arranged to:
analyze the service;
extract information from the service;
create a second data object representing the service;
transmit the second data object over the network to the third electronic device for storage in the data object list that is maintained by the third electronic device; and
allow at least one other electronic device in the network to control the service based on the second data object that was transmitted.

19. The electronic device according to claim 17, wherein the first action that the electronic device is capable of performing is pausing or resuming a data stream.

20. The electronic device according to claim 17, wherein the processor of the electronic device is further arranged to:
retrieve a second data object from the data object list; and
control the service based on the second data object that was retrieved.

21. The electronic device according to claim 17, wherein the processor of the electronic device is further arranged to periodically retransmit the first data object over the network to the third electronic device.

22. The electronic device according to claim 17, wherein the processor of the electronic device is further arranged to:
determine if one of the other electronic devices connected to the network having responsibility of execution of one or more computer programs is inoperative, and
identify another electronic device for taking responsibility of execution of the one or more computer programs.

23. The electronic device according to claim 17, wherein the first data object contains information allowing the electronic device that performs the first action to be determined.

24. The electronic device according to claim 17, wherein the first data object is a text string.

25. The electronic device according to claim 24, wherein the text string contains a plurality of data fields.

26. The electronic device according to claim 25, wherein one of the data fields contains an indication of the status of the action.

27. The electronic device according to claim 17, wherein the electronic device comprises one of lap-top computer, desktop computer, games console, television set, set-top box, DVD player, MP3 player, MJPEG camera or digital movie camera.

28. The electronic device according to claim 17, wherein the network is connected to at least one external data source.

29. The electronic device according to claim 28, wherein the external data source includes at least one of satellite television, cable television, terrestrial digital television, terrestrial television, cable, Telco data, Telco telephone data, or one or more further networks.

30. A network comprising two or more electronic devices according to claim 17.

31. A set-top-box comprising the electronic device according to claim 17.

32. The network according to claim 30, wherein the processor of the third electronic device is arranged to maintain the data object list for storing data objects transmitted over the network by executing a controlling program.

33. The electronic device according to claim 32, wherein the processor of the third electronic device is further arranged to maintain the data object list for presentation as one or more web pages.

34. The electronic device according to claim 32, wherein the processor of the third electronic device is further arranged to delete one data object from the data object list if the one data object is not retransmitted within a period of time.

35. A computer program product having stored thereon a computer program for transferring control of a service provided over a network from a first electronic device to a second electronic device, the computer program comprising computer executable instructions that when executed on a processor cause the processor to perform the steps of:
  performing, by the first electronic device a first action to control the service;
  in response to performing the first action to control the service, creating, by the first electronic device, a first data object representing the first action;
  transmitting the first data object from the first electronic device over the network to a third electronic device for storage in a data object list that is maintained by the third electronic device; and
  performing, by the second electronic device, a second action to control the service based on the first data object, so as to transfer control of the service from the first electronic device to the second electronic device.

* * * * *